US011996620B2

(12) United States Patent
Zhang et al.

(10) Patent No.: US 11,996,620 B2
(45) Date of Patent: May 28, 2024

(54) ANTENNA DEVICE

(71) Applicant: Molex, LLC, Lisle, IL (US)

(72) Inventors: Ping Zhang, Shanghai (CN); Guang Yong Zhong, Shanghai (CN); Xue Tian Zhao, Shanghai (CN); Chun Xia Zhang, Shanghai (CN); Hai Liu, Shanghai (CN); Kang Cheng, Shanghai (CN); Qian Gao, Shanghai (CN)

(73) Assignee: Molex, LLC, Lisle, IL (US)

( * ) Notice: Subject to any disclaimer, the term of this patent is extended or adjusted under 35 U.S.C. 154(b) by 84 days.

(21) Appl. No.: 17/517,685

(22) Filed: Nov. 3, 2021

(65) Prior Publication Data

US 2022/0166148 A1 May 26, 2022

(30) Foreign Application Priority Data

Nov. 20, 2020 (CN) ........................ 202011310103.X

(51) Int. Cl.
*H01Q 21/00* (2006.01)
*H01Q 1/48* (2006.01)
*H01Q 9/42* (2006.01)

(52) U.S. Cl.
CPC ........... *H01Q 21/0075* (2013.01); *H01Q 1/48* (2013.01); *H01Q 9/42* (2013.01)

(58) Field of Classification Search
CPC .......... H01Q 21/28; H01Q 1/521; H01Q 1/38; H01Q 1/52; H01Q 21/00; H01Q 1/30; H01Q 21/30; H01Q 13/206; H01Q 21/0037; H01Q 21/061; H01Q 13/08; H01Q 13/106; H01Q 21/0075; H01Q 1/48; H01Q 9/42; H05K 1/113
See application file for complete search history.

(56) References Cited

U.S. PATENT DOCUMENTS 10,347,977 B1 * 7/2019 Kim ....................... H01Q 21/28
10,476,163 B2 11/2019 Chen
2010/0060544 A1 * 3/2010 Penev ................. H01Q 9/0442 343/876

(Continued)

FOREIGN PATENT DOCUMENTS

CN 209804903 U 12/2019
KR 20150055042 A 5/2015

(Continued)

*Primary Examiner* — Ricardo I Magallanes

(57) ABSTRACT

An antenna device includes an insulating carrier and a first primary antenna having a first feeding-in section, a first auxiliary antenna having a second feeding-in section and a second grounding section, a second primary antenna having a third feeding-in section, a second auxiliary antenna having a fourth feeding-in section and a grounding face which are provided on a face of the carrier. The first primary and auxiliary antennas and the second primary and auxiliary antennas are positioned at two side edges of the carrier which are away from each other. The grounding face is positioned between both the first primary and auxiliary antennas and the second primary and auxiliary antennas. The grounding face is provided with a first grounding section adjacent to the first feeding-in section, a third grounding section adjacent to third feeding-in section and a fourth grounding section adjacent to the fourth feeding-in section.

27 Claims, 10 Drawing Sheets

(56) References Cited

U.S. PATENT DOCUMENTS

| | | | | |
|---|---|---|---|---|
| 2010/0117908 | A2* | 5/2010 | Lee | H01P 3/00 343/700 MS |
| 2010/0134376 | A1* | 6/2010 | Margomenos | H01Q 21/065 343/860 |
| 2010/0225554 | A1* | 9/2010 | Huang | H01Q 15/0086 343/859 |
| 2011/0026624 | A1* | 2/2011 | Gummalla | H01Q 15/0086 342/374 |
| 2015/0138035 | A1* | 5/2015 | Lee | H01Q 9/045 343/843 |
| 2015/0295311 | A1 | 10/2015 | Bringuier et al. | |
| 2016/0164189 | A1* | 6/2016 | Jafarlou | H01Q 13/02 29/601 |
| 2017/0084997 | A1* | 3/2017 | Wu | H01Q 1/50 |
| 2017/0125916 | A1* | 5/2017 | Camacho | H01Q 5/371 |
| 2018/0027647 | A1* | 1/2018 | Rengarajan | G01S 7/03 342/175 |
| 2019/0115654 | A1* | 4/2019 | Huang | H01Q 9/40 |
| 2019/0372241 | A1* | 12/2019 | Sharawi | H01Q 9/0421 |
| 2019/0379135 | A1* | 12/2019 | Sharawi | H01Q 21/064 |
| 2020/0176859 | A1* | 6/2020 | Furlan | H01Q 1/1271 |
| 2021/0005975 | A1* | 1/2021 | Hussain | H01Q 21/28 |
| 2022/0416429 | A1* | 12/2022 | Matsunaga | H01Q 11/08 |

FOREIGN PATENT DOCUMENTS

| | | | |
|---|---|---|---|
| KR | 20150122746 | A | 11/2015 |
| KR | 20200123859 | A | 10/2020 |
| TW | 201721977 | A | 6/2017 |
| TW | 201824647 | A | 7/2018 |

* cited by examiner

ANTENNA DEVICE

RELATED APPLICATION

This application claims priority to Chinese Application Serial No. 202011310103.X, filed on Nov. 20, 2020, which is incorporated by reference in its entirety.

TECHNICAL FIELD

The present disclosure relates to an antenna, particularly relates to an antenna device which integrate multiple types of antennas.

BACKGROUND

As the market's demand for communication continuously increases, the fifth-generation (5G) mobile communication is booming and popularized rapidly. The demand for integration of mobile communication, WIFI communication, and global positioning and navigation from automotive, medical, and Internet of Things devices is becoming more and wider. Therefore, the requirement of the above multiple communication modes proposes new challenge to the design of the antenna. In addition, in order to improve the communication capacity, data transferring speed and anti-multipath fading capability of the communication system, a multiple-input multiple-output system (abbreviated as MIMO) which uses multiple antennas to perform communications at the same time at a transmitting end and a receiving end become a key technology.

The MIMO communication of a mobile communication terminal requires at least two antennas (a primary antenna and an auxiliary antenna), and in order to ensure an isolation degree between the primary antenna and the auxiliary antenna, dimensions of the antennas are usually required to be as large as possible. However, a dimension of the mobile communication terminal is relatively small, even for vehicle-mounted antennas, due to the limitation of the mounting space on the vehicle, dimensions of the antennas are required to be as small as possible. In addition, because 5G antennas need to be compatible with 2G, 3G and Sub 6G frequency segments, frequency bands of the antennas are relatively wide, and the dimensions of the antennas need to be increased. In this way, there is a confliction. On one hand, the antennas need larger dimensions for good performance, and on the other hand, the dimensions of the antennas are required to be as small as possible in practical use. However, the current 5G MIMO antenna system is either large in dimension or makes the primary antenna and the auxiliary antenna divided into two independent antennas and mounted separately. But this will increase the overall manufacturing cost and mounting cost of the antennas. Otherwise, the dimensions of the antennas are reduced by reducing performance of the antennas, but this approach will greatly reduce the isolation degree between the primary antenna and auxiliary antenna of the MIMO antenna system, which makes the overall data throughput of the communication system difficult to be increased.

SUMMARY

Therefore, an object of the present disclosure is to provide an antenna device which integrates multiple types of antennas and considers antenna dimension and antenna performance at the same time so as to provide a small dimension multiple-in-one antenna which meets requirement on multiple frequency segments and high isolation degree.

Accordingly, in the present disclosure, an antenna device comprises a circuit board, The circuit board comprises an insulating carrier, a first primary antenna, a first auxiliary antenna, a second primary antenna, a second auxiliary antenna and a grounding unit. The insulating carrier has a first face and a second face which are opposite to each other; the first primary antenna and the first auxiliary antenna operate at a first frequency segment and are respectively provided on the first face of the insulating carrier; the second primary antenna and the second auxiliary antenna operate at second frequency segment and are respectively provided on the first face of the insulating carrier; the grounding unit comprises a first grounding face provided on the first face of the insulating carrier, and the first grounding face is positioned between the first primary antenna and the first auxiliary antenna and is positioned between the second primary antenna and the second auxiliary antenna.

In some embodiments of the present disclosure, the first primary antenna has a first feeding-in section, the first auxiliary antenna has a second feeding-in section and a second grounding section adjacent to the second feeding-in section, the second primary antenna has a third feeding-in section, the second auxiliary antenna has a fourth feeding-in section, and the first grounding face is provided with a first grounding section adjacent to the first feeding-in section, a third grounding section adjacent to the third feeding-in section and a fourth grounding section adjacent to the fourth feeding-in section.

In some embodiments of the present disclosure, the insulating carrier has a first side edge and a second side edge which face each other and a third side edge and a fourth side edge which are connected with the first side edge and the second side edge and face each other, the first side edge, the second side edge, the third side edge and the fourth side edge define a periphery of the insulating carrier, the first primary antenna is close to the first side edge, the first auxiliary antenna is close to the second side edge, the second primary antenna is close to the third side edge, and the second auxiliary antenna is close to the fourth side edge.

In some embodiments of the present disclosure, the first primary antenna comprises a first monopole antenna connected with the first feeding-in section, the first auxiliary antenna comprises a second monopole antenna which is connected with the second feeding-in section and at least one coupling element which extends outwardly from the second grounding section and is spaced apart from and adjacent to the second monopole antenna so as to be electrically coupled with the second monopole antenna, the second primary antenna comprises a third monopole antenna connected with the third feeding-in section, the second auxiliary antenna comprises an inversed-F antenna connected with the fourth feeding-in section.

In some embodiments of the present disclosure, the first primary antenna comprises a first monopole antenna connected with the first feeding-in section, the first auxiliary antenna comprises a second monopole antenna which is connected with the second feeding-in section and at least one coupling element which extends outwardly from the second grounding section and is spaced apart from and adjacent to the second monopole antenna so as to be electrically coupled with the second monopole antenna, the second primary antenna comprises an inversed-F antenna connected with the third feeding-in section, the second auxiliary antenna comprises a third monopole antenna connected with the fourth feeding-in section.

In some embodiments of the present disclosure, the first feeding-in section is surrounded by the first grounding face but is spaced apart from the first grounding face, and the first primary antenna further comprises a first microstrip line, the first microstrip line extends outwardly from the first monopole antenna, enters into the first grounding face in a manner that the first microstrip line is spaced apart from the first grounding face, and connects the first feeding-in section; the third feeding-in section is surrounded by the first grounding face but is spaced apart from the first grounding face, and the second primary antenna further comprises a second microstrip line, the second microstrip line extends outwardly from the third monopole antenna, enters into the first grounding face in a manner that the second microstrip line is spaced apart from the first grounding face, and connects the third feeding-in section; the fourth feeding-in section is surrounded by the first grounding face but is spaced apart from the first grounding face, and the second auxiliary antenna further comprises a third microstrip line, the third microstrip line extends from a feeding-in end of the inversed-F antenna, enters into the first grounding face in a manner that the third microstrip line is spaced apart from the first grounding face, and connects the fourth feeding-in section.

In some embodiments of the present disclosure, the first feeding-in section is surrounded by the first grounding face but is spaced apart from the first grounding face, and the first primary antenna further comprises a first microstrip line, the first microstrip line extends from an end of the first monopole antenna, enters into the first grounding face in a manner that the first microstrip line is spaced apart from the first grounding face, and connects the first feeding-in section; the third feeding-in section is surrounded by the first grounding face but is spaced apart from the first grounding face, and the second primary antenna further comprises a second microstrip line, the second microstrip line extends from a feeding-in end of the inversed-F antenna, enters into the first grounding face in a manner that the second microstrip line is spaced apart from the first grounding face, and connects the third feeding-in section; the fourth feeding-in section is surrounded by the first grounding face but is spaced apart from the first grounding face, and the second auxiliary antenna further comprises a third microstrip line, the third microstrip line extends from an end of the third monopole antenna, enters into the first grounding face in a manner that the third microstrip line is spaced apart from the first grounding face, and connects the fourth feeding-in section.

In some embodiments of the present disclosure, the grounding unit further comprises a second grounding face provided on the second face of the insulating carrier, and electrical conduction through holes are formed between the second grounding face and the first grounding face and electrically connect the second grounding face and the first grounding face.

In some embodiments of the present disclosure, the grounding unit further comprises a second grounding face provided on the second face of the insulating carrier, electrical conduction through holes which surround the first feeding-in section and extend along two sides of the first microstrip line, electrical conduction through holes which surround the third feeding-in section and extend along two sides of the second microstrip line and electrical conduction through holes which surrounds the fourth feeding-in section and extend along two sides of the third microstrip line are formed between the first grounding face and the second grounding face, and the electrical conduction through holes electrically connects the grounding face and the first grounding face.

In some embodiments of the present disclosure, the first primary antenna further comprises a first parasitic element, the first parasitic element is spaced apart from and adjacent to the first monopole antenna so as to be electrically coupled with the first monopole antenna, and an end of the first parasitic element is connected with the first grounding face; the first auxiliary antenna further comprises a fourth monopole antenna provided on the second face, and an end of the fourth monopole antenna is electrically connected with the second feeding-in section via the electrical conduction through holes formed between the first face and the second face; the second primary antenna further comprises a second parasitic element, the second parasitic element is spaced apart from and adjacent to the third monopole antenna so as to be electrically coupled with the third monopole antenna, and an end of the second parasitic element is connected with the first grounding face.

In some embodiments of the present disclosure, the first primary antenna, the first auxiliary antenna, the second primary antenna, the second auxiliary antenna and the grounding unit are respectively formed from copper foils printed on the first face and the second face of the insulating carrier.

In some embodiments of the present disclosure, the grounding unit further comprises a second grounding face provided on the second face of the insulating carrier, and electrical conduction through holes are formed between the second grounding face and the first grounding face to electrically connect the second grounding face and the first grounding face; the second face is formed with a first feed-in soldering pad corresponding to the first feeding-in section, a second feed-in soldering pad corresponding to the second feeding-in section, a second ground soldering pad corresponding to the second grounding section, a third feed-in soldering pad corresponding to the third feeding-in section and a fourth feed-in soldering pad corresponding to the fourth feeding-in section; and the second grounding face is formed with a first ground soldering pad corresponding to the first grounding section, a third ground soldering pad corresponding to the third grounding section and a fourth ground soldering pad corresponding to the fourth grounding section; wherein electrical conduction through holes are formed between the first feeding-in section and the first feed-in soldering pad to electrically connect the first feeding-in section and the first feed-in soldering pad, electrical conduction through holes are formed between the second feeding-in section and the second feed-in soldering pad to electrically connect the second feeding-in section and the second feed-in soldering pad, electrical conduction through holes are formed between the third feeding-in section and the third feed-in soldering pad to electrically connect the third feeding-in section and the third feed-in soldering pad, electrical conduction through holes are formed between the fourth feeding-in section and the fourth feed-in soldering pad to electrically connect the fourth feeding-in section and the fourth feed-in soldering pad, electrical conduction through holes are formed between the first grounding section and the first ground soldering pad to electrically connect the first grounding section and the first ground soldering pad, electrical conduction through holes are formed between the second grounding section and the second ground soldering pad to electrically connect the second grounding section and the second ground soldering pad, electrical conduction through holes are formed between the third grounding section and the third ground soldering pad to electrically connect the third grounding section and the third ground soldering pad, electrical conduction through holes are formed between the fourth grounding section and the fourth ground soldering pad to electrically connect the fourth grounding section and the fourth ground soldering pad.

In some embodiments of the present disclosure, the second face is formed with a first feed-in soldering pad which corresponds to the first feeding-in section and is surrounded the second grounding face but is spaced apart from the second grounding face, a second feed-in soldering pad which corresponds to the second feeding-in section, a second ground soldering pad which corresponds to the second grounding section, a third feed-in soldering pad which corresponds to the third feeding-in section and is surrounded by the second grounding face but is spaced apart from the second grounding face, and a fourth feed-in soldering pad which corresponds to the fourth feeding-in section and is surrounded by the second grounding face but is spaced apart from the second grounding face; and the second grounding face is formed with a first ground soldering pad corresponding to the first grounding section, a third ground soldering pad corresponding to the third grounding section and a fourth ground soldering pad corresponding to the fourth grounding section; wherein, electrical conduction through holes are formed between the first feeding-in section and the first feed-in soldering pad to electrically connect the first feeding-in section and the first feed-in soldering pad, electrical conduction through holes are formed between the second feeding-in section and the second feed-in soldering pad to electrically connect the second feeding-in section and the second feed-in soldering pad, electrical conduction through holes are formed between the third feeding-in section and the third feed-in soldering pad to electrically connect the third feeding-in section and the third feed-in soldering pad, electrical conduction through holes are formed between the fourth feeding-in section and the fourth feed-in soldering pad to electrically connect the fourth feeding-in section and the fourth feed-in soldering pad, electrical conduction through holes are formed between the first grounding section and the first ground soldering pad to electrically connect the first grounding section and the first ground soldering pad, electrical conduction through holes are formed between the second grounding section and the second ground soldering pad to electrically connect the second grounding section and the second ground soldering pad, electrical conduction through holes are formed between the third grounding section and the third ground soldering pad to electrically connect the third grounding section and the third ground soldering pad, electrical conduction through holes are formed between the fourth grounding section and the fourth ground soldering pad to electrically connect the fourth grounding section and the fourth ground soldering pad.

In some embodiments of the present disclosure, the first feed-in soldering pad is used to be soldered with an inner conductor of a first radio frequency transferring line, the first ground soldering pad is used to be soldered with an outer conductor of the first radio frequency transferring line, the outer conductor and the inner conductor of the first radio frequency transferring line are insulated from each other; the second feed-in soldering pad is used to be soldered with an inner conductor of a second radio frequency transferring line, the second ground soldering pad is used to be soldered with an outer conductor of the second radio frequency transferring line, the outer conductor and the inner conductor of the second radio frequency transferring line are insulated from each other; the third feed-in soldering pad is used to be soldered with an inner conductor of a third radio frequency transferring line, the third ground soldering pad is used to be soldered with an outer conductor of the third radio frequency transferring line, the outer conductor and the inner conductor of the third radio frequency transferring line are insulated from each other; the fourth feed-in soldering pad is used to be soldered with an inner conductor of a fourth radio frequency transferring line the fourth ground soldering pad is used to b soldered with an outer conductor of the fourth radio frequency transferring line the outer conductor and the inner conductor of the fourth radio frequency transferring line are insulated from each other.

In some embodiments of the present disclosure, the antenna device further comprises an outer casing accommodating the circuit board and an elastic filler filled into an opening of the outer casing, the first radio frequency transferring line, the second radio frequency transferring line, the third radio frequency transferring line and the fourth radio frequency transferring line enter into the outer casing via the opening, and the elastic filler allows the first radio frequency transferring line, the second radio frequency transferring line, the third radio frequency transferring line and the fourth radio frequency transferring line to pass therethrough, so as to fix the first radio frequency transferring line, the second radio frequency transferring line, the third radio frequency transferring line and the fourth radio frequency transferring line on the outer casing.

In some embodiments of the present disclosure, the antenna device further comprises a global satellite navigation system antenna provided on the insulating carrier, the global satellite navigation system antenna comprises a ceramic dielectric antenna operating at a third frequency segment, the ceramic dielectric antenna is provided on the first face of the insulating carrier.

In some embodiments of the present disclosure, the global satellite navigation system antenna further comprises a low noise amplifying circuit, the low noise amplifying circuit is provided on the second grounding face of the insulating carrier, the ceramic dielectric antenna is electrically connected with the low noise amplifying circuit via a feeding pin passing through the insulating carrier; and an outputting end of the low noise amplifying circuit is electrically connected with an inner conductor of a fifth radio frequency transferring line, and an outer conductor of the fifth radio frequency transferring line which is insulated from the inner conductor of the fifth radio frequency transferring line and a fifth grounding section which is formed on the second grounding face are electrically connected.

In some embodiments of the present disclosure, the first frequency segment comprises 698-960 MHz, 1710-2690 MHz, 3300-4200 MHz and 4400-5000 MHz; the second frequency segment comprises 2400-2485 MHz and 5150-5850 MHz; third frequency segment comprises 1561-1602 MHz.

Moreover, in the present disclosure, an antenna device comprises a circuit board, the circuit board comprises an insulating carrier, a first grounding face and an antenna. The insulating carrier has a first face and a second face which are opposite to each other; the first grounding face is provided on the first face of the insulating carrier and has a grounding section; the antenna is provided the first face of the insulating carrier and has a radiating body, a feeding-in section and a microstrip line, the feeding-in section is surrounded by the first grounding face and is spaced apart from the first grounding face, the microstrip line extends from an end of the radiating body, enters into the first grounding face in a manner that the microstrip line is spaced apart from the first grounding face, and connects the feeding-in section; and the insulating carrier is formed with electrical conduction through holes which surround the feeding-in section and extend along two sides of the microstrip line, the electrical conduction through holes pass through the first face and the second face of the insulating carrier.

In some embodiments of the present disclosure, the circuit board further comprises a second grounding face provided on the second face of the insulating carrier, and electrical conduction through holes are formed between the second grounding face and the first grounding face to electrically connect the second grounding face and the first grounding face, and the electrical conduction through holes which surround the feeding-in section and extend along the two sides of the microstrip line electrically connect the second grounding face and the first grounding face.

In some embodiments of the present disclosure, the second face is formed with a feed-in soldering pad corresponding to the feeding-in section and a ground soldering pad corresponding to the grounding section, and electrical conduction through holes are formed between the feeding-in section and the feed-in soldering pad to electrically connect the feeding-in section and the feed-in soldering pad, electrical conduction through holes are formed between the grounding section and the ground soldering pad to electrically connect the grounding section and the ground soldering pad.

In some embodiments of the present disclosure, the antenna, the first grounding face and the second grounding face are respectively form from copper foils printed the first face and the second face of the insulating carrier.

The effect of the present disclosure lies in that: the present disclosure makes the multiple types of the antennas integrated on the single small dimension circuit board and makes the antennas have good radiation performance and isolation degree, solves a problem that a traditional multiple-in-one antenna cannot meet small dimension, multiple frequency segment operation and high isolation degree at the same time.

BRIEF DESCRIPTION OF THE DRAWINGS

Other features and effects of the present disclosure will be apparent in an embodiment referring to the accompanying drawings, in which.

DETAILED DESCRIPTION OF PREFERRED EMBODIMENTS

Figure 1:
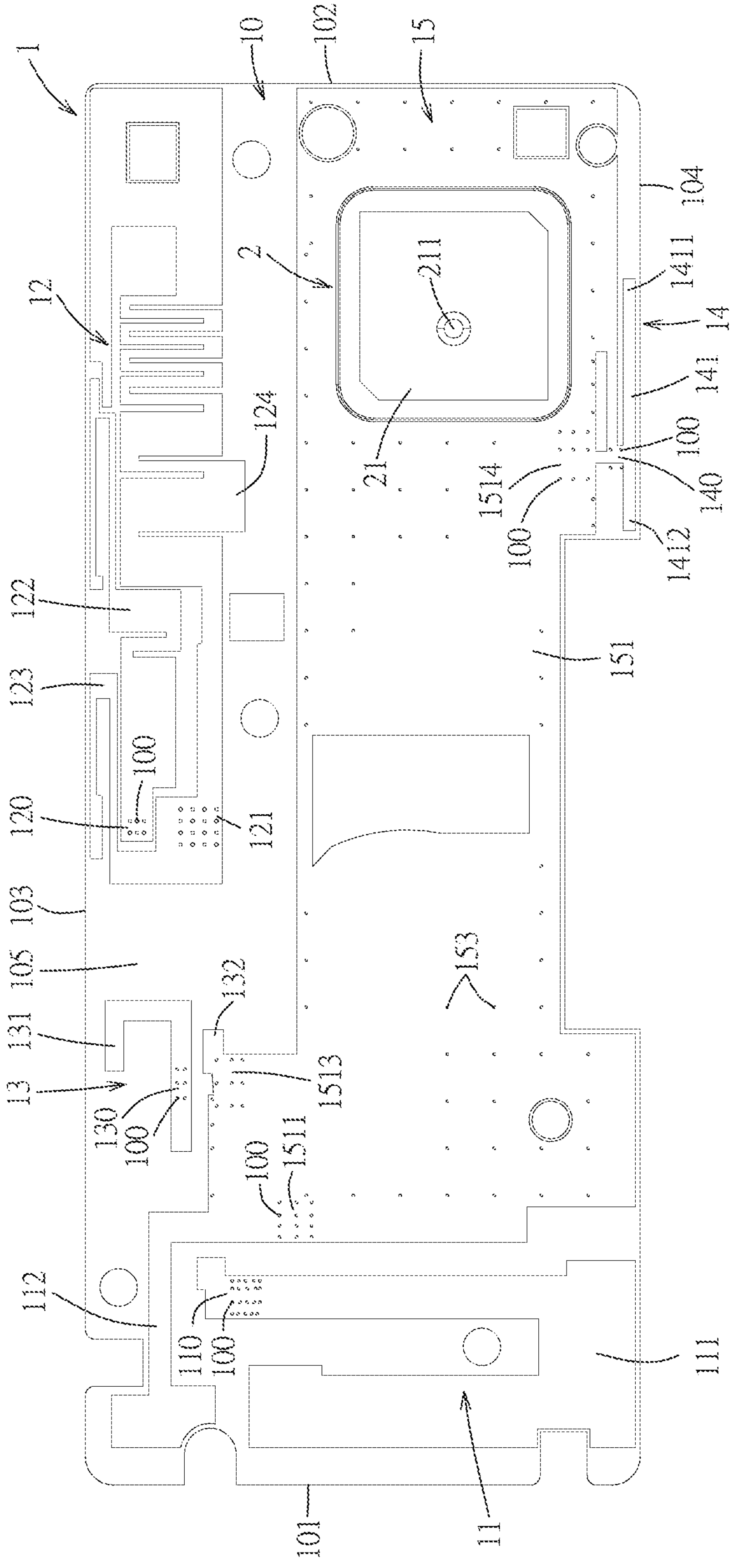
FIG. 1 is a construction schematic view of a first face of a circuit board of a first embodiment of an antenna device of the present disclosure.

Before the present disclosure is described in detail, it is noted that the similar components are indicated by the same reference numerals in the following description.

Figure 2:
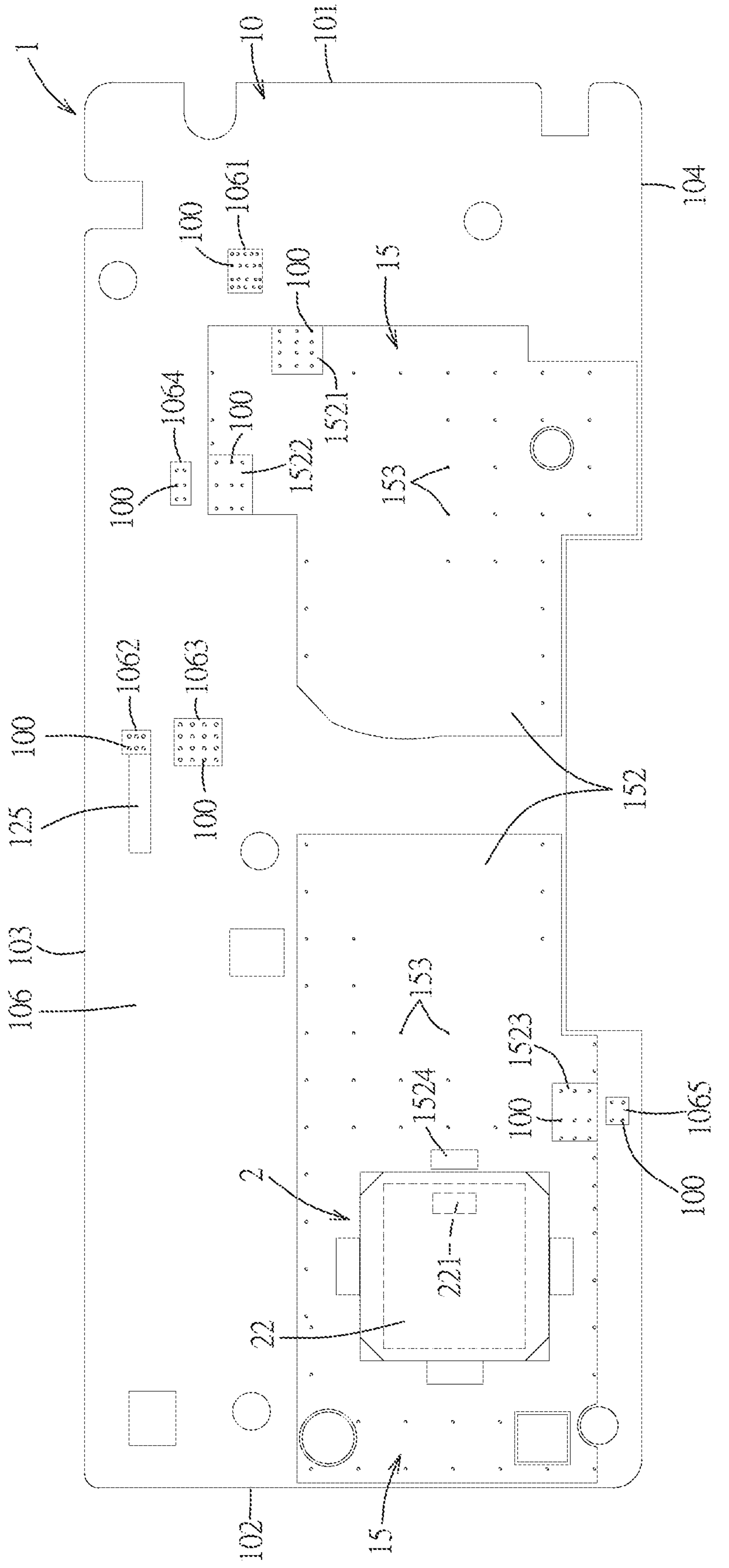
FIG. 2 is a construction schematic view of a second face of the circuit board of the first embodiment.

Referring to FIG. 1 and FIG. 2, a first embodiment of an antenna device of the present disclosure includes a circuit board 1, the circuit board 1 includes an insulating carrier 10 and a first primary antenna 11, a first auxiliary antenna 12, a second primary antenna 13, a second auxiliary antenna 14 and a grounding unit 15 which are provided to a surface of the insulating carrier 10. The insulating carrier 10 has a first side edge 101 and a second side edge 102 which face each other and a third side edge 103 and a fourth side edge 104 which are connected with the first side edge 101 and the second side edge 102 and face each other, the first side edge 101, the second side edge 102, the third side edge 103 and the fourth side edge 104 define a periphery of the insulating carrier 10, and the insulating carrier 10 has a first face 105 and a second face 106 which are opposite to each other.

The first primary antenna 11 operates at a first frequency segment, is provided on the first face 105 of the insulating carrier 10, is close to the first side edge 101, and has a first feeding-in section 110. The first auxiliary antenna 12 operates at the first frequency segment, is provided on the first face 105 of the insulating carrier 10, is close to the second side edge 102, and has a second feeding-in section 120 and a second grounding section 121 adjacent to the second feeding-in section 120. The second primary antenna 13 operates at a second frequency segment, is provided on the first face 105 of the insulating carrier 10, is close to the third side edge 103, and has a third feeding-in section 130. The second auxiliary antenna 14 operates at the second frequency segment, is provided on the first face 105 of the insulating carrier 10, is close to the fourth side edge 104, and has a fourth feeding-in section 140. The grounding unit 15 includes a first grounding face 151 provided on the first face 105 of the insulating carrier 10, and the first grounding face 151 is positioned between the first primary antenna 11 and the first auxiliary antenna 12 and is positioned between the second primary antenna 13 and the second auxiliary antenna 14.

Also, the first grounding face 151 is provided with a first grounding section 1511 which is adjacent to the first feeding-in section 110, a third grounding section 1513 which is adjacent to the third feeding-in section 130 and a fourth grounding section 1514 which is adjacent to the fourth feeding-in section 140. Therefore, the first primary antenna 11 and the first auxiliary antenna 12 are isolated by the first grounding face 151, and the first grounding section 1511 and the second grounding section 121 do not share the first grounding face 151 and thus are not connected with each other, so that the first primary antenna 11 and the first auxiliary antenna 12 can operate independently from each other and are effectively isolated, which ensure that the first primary antenna 11 and the first auxiliary antenna 12 have good isolation degree in the first frequency segment; and, the second primary antenna 13 and the second auxiliary antenna 14 are isolated by the first grounding face 151, so the second primary antenna 13 and the second auxiliary antenna 14 are independent from each other and are effectively isolated, which ensure that the second primary antenna 13 and the second auxiliary antenna 14 have good isolation degree in the second frequency segment.

Specifically, the first primary antenna 11 (a radiating body) includes a first monopole antenna 111 connected with the first feeding-in section 110 and a first parasitic element 112, an end of the first parasitic element 112 is connected with the first grounding face 151, and the first parasitic element 112 is spaced apart from and adjacent to the first monopole antenna 111, so the first parasitic element 112 and the first monopole antenna 111 are electrically coupled with each other and generate radiation and together constitute a LTE/5G broad frequency segment primary antenna. The first auxiliary antenna 12 (a radiating body) includes a second monopole antenna 122 connected with the second feeding-in section 120 and a first coupling element 123 and a second coupling element 124, the first coupling element 123 and the second coupling element 124 respectively extend outwardly from the second grounding section 121 and are spaced apart from and adjacent to the second monopole antenna 122, so the first coupling element 123 and the second coupling element 124 and the second monopole antenna 122 are electrically coupled with each other and generate radiation and together constitute a LTE/5G broad frequency segment auxiliary antenna.

The second primary antenna 13 (a radiating body) includes a third monopole antenna 131 connected with the third feeding-in section 130 and a second parasitic element 132, an end of the second parasitic element 132 is connected with the first grounding face 151 (or the third grounding section 1513), and the second parasitic element 132 is spaced apart from and adjacent to the third monopole antenna 131, so the second parasitic element 132 and the third monopole antenna 131 are electrically coupled with each other and generate radiation and together constitute a WIFI dual frequency segment primary antenna. The second auxiliary antenna 14 (a radiating body) includes an inversed-F antenna 141 connected with the fourth feeding-in section 140 and the first grounding face 151, the inversed-F antenna 141 acts as a WIFI dual frequency segment auxiliary antenna. It is noted that, the third monopole antenna 131 and the inversed-F antenna 141 also may be interchanged, that is to say, the inversed-F antenna 141 is connected with the third feeding-in section 130, but the third monopole antenna 131 is connected with the fourth feeding-in section 140. Therefore, the second primary antenna 13 and the second auxiliary antenna 14 use different types of antennas, and the second primary antenna 13 and the second auxiliary antenna 14 maintain larger distance, so isolation degree between the second primary antenna 13 and the second auxiliary antenna 14 may be promoted.

Moreover, referring to FIG. 1 and FIG. 2, in the present embodiment, the grounding unit 15 further includes a second grounding face 152 provided on the second face 106 of the insulating carrier 10, and electrical conduction through holes 153 are formed between the second grounding face 152 and the first grounding face 151 to electrically connect the second grounding face 152 and the first grounding face 151. Also, the second face 106 is formed with a first feed-in soldering pad 1061 corresponding to the first feeding-in section 110, a second feed-in soldering pad 1062 corresponding to the second feeding-in section 120, a second ground soldering pad 1063 corresponding to the second grounding section 121, a third feed-in soldering pad 1064 corresponding to the third feeding-in section 130, a fourth feed-in soldering pad 1065 corresponding to the fourth feeding-in section 140; and the second grounding face 152 is formed with a first ground soldering pad 1521 corresponding to the first grounding section 1511, a third ground soldering pad 1522 corresponding to the third grounding section 1513 and a fourth ground soldering pad 1523 corresponding to the fourth grounding section 1514. Also, the first auxiliary antenna 12 further includes a fourth monopole antenna 125 provided on the second face 106, and an end of the fourth monopole antenna 125 is connected with the second feed-in soldering pad 1062.

Electrical conduction through holes 100 are formed between the first feeding-in section 110 and the first feed-in soldering pad 1061 to electrically connect the first feeding-in section 110 and the first feed-in soldering pad 1061, electrical conduction through holes 100 are formed between the second feeding-in section 120 and the second feed-in soldering pad 1062 to electrically connect the second feeding-in section 120 and the second feed-in soldering pad 106, electrical conduction through holes 100 are formed between the third feeding-in section 130 and the third feed-in soldering pad 1064 to electrically connect the third feeding-in section 130 and the third feed-in soldering pad 1064, and electrical conduction through holes 100 are formed between the fourth feeding-in section 140 and the fourth feed-in soldering pad 1065 to electrically connect the fourth feeding-in section 140 and the fourth feed-in soldering pad 1065. Electrical conduction through holes 100 are formed between the first grounding section 1511 and the first ground soldering pad 1521 to electrically connect the first grounding section 1511 and the first ground soldering pad 1521, electrical conduction through holes 100 are formed between the second grounding section 121 and the second ground soldering pad 1063 to electrically connect the second grounding section 121 and the second ground soldering pad 1063, electrical conduction through holes 100 are formed between the third grounding section 1513 and the third ground soldering pad 1522 to electrically connect the third grounding section 1513 and the third ground soldering pad 1522, and electrical conduction through holes 100 are formed between the fourth grounding section 1514 and the fourth ground soldering pad 1523 to electrically connect the fourth grounding section 1514 and the fourth ground soldering pad 1523.

Figure 3:
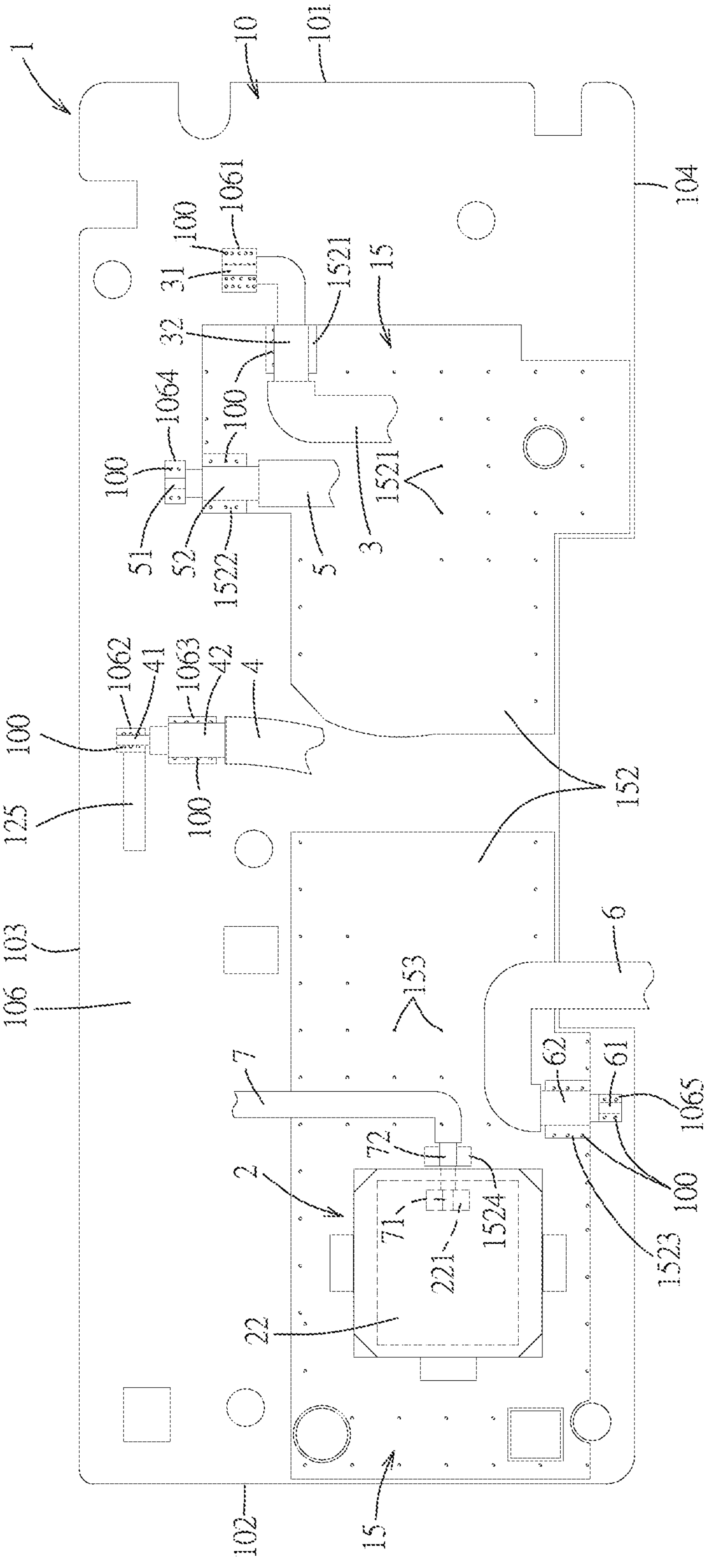
FIG. 3 is a schematic view of connections between the second face of the circuit board of the first embodiment and multiple radio frequency transferring lines.

Therefore, as shown in FIG. 3, the first feed-in soldering pad 1061 may allow an inner conductor 31 of a first radio frequency transferring line 3 to be soldered therewith, the first ground soldering pad 1521 may allow an outer conductor 32 (the outer conductor 32 and the inner conductor 31 are insulated from each other) of the first radio frequency transferring line 3 to be soldered therewith, so as to feed a radio frequency signal to enter into/exit from the first radio frequency transferring line 3. The second feed-in soldering pad 1062 may allow an inner conductor 41 of a second radio frequency transferring line 4 to be soldered therewith, the second ground soldering pad 1063 may allow an outer conductor 42 (the outer conductor 42 and the inner conductor 41 are insulated from each other) of the second radio frequency transferring line 4 to be soldered therewith, so as to feed a radio frequency signal to enter into/exit from the second radio frequency transferring line 4. The third feed-in soldering pad 1064 may allow an inner conductor 51 of a third radio frequency transferring line 5 to be soldered therewith, the third ground soldering pad 1522 may allow an outer conductor 52 (the outer conductor 52 and the inner conductor 51 are insulated from each other) of the third radio frequency transferring line 5 to be soldered therewith, so as to feed a radio frequency signal to enter into/exit from the third radio frequency transferring line 5. The fourth feed-in soldering pad 1065 may allow an inner conductor 61 of a fourth radio frequency transferring line 6 to be soldered therewith, the fourth ground soldering pad 1523 may allow an outer conductor 62 (the outer conductor 62 and the inner conductor 61 are insulated from each other) of the fourth radio frequency transferring line 6 to be soldered therewith, so as to feed radio frequency signal to enter into/exit from the fourth radio frequency transferring line 6. And the first-fourth radio frequency transferring lines 3, 4, 5, 6 all are collected on the second face 106 of the circuit board 1, which does not interfere with the antennas formed on the first face 105.

Moreover, as shown in FIG. 1 and FIG. 2, the present embodiment further includes a global satellite navigation system (GPS) antenna 2 provided on the insulating carrier 10. The global satellite navigation system antenna 2 includes a ceramic dielectric antenna 21 operating at a third frequency segment and a low noise amplifying circuit 22. The ceramic dielectric antenna 21 is provided on the first face 105 of the insulating carrier 10 and is positioned on the first grounding face 151, the low noise amplifying circuit 22 is provided on the second face 106 of the insulating carrier 10 and is positioned on the second grounding face 152; the ceramic dielectric antenna 21 is electrically connect with the low noise amplifying circuit 22 via a feeding pin 211 passing through the insulating carrier 10. And as shown in FIG. 3, an outputting end 221 of the low noise amplifying circuit 22 may allow an inner conductor 71 of a fifth radio frequency transferring line 7 to be electrically connected therewith, and an outer conductor 72 (the outer conductor 72 and the inner conductor 71 are insulated from each other) of the fifth radio frequency transferring line 7 and a fifth ground soldering pad 1524 formed on the second grounding face 152 are electrically connected, so as to feed a radio frequency signal received by the ceramic dielectric antenna 21 and amplified via the low noise amplifying circuit 22 to the fifth radio frequency transferring line 7. It is noted that, the low noise amplifying circuit 22 is not a necessary element, also may be omitted as practical application circumstance or requirement.

In addition, in the present embodiment, the circuit board 1 is a printed circuit board, the insulating carrier 10 uses a polytetrafluoroethylene substrate, and the first primary antenna 11, the first auxiliary antenna 12, the second primary antenna 13, the second auxiliary antenna 14 and the grounding unit 15 are respectively formed by copper foils printed on the first face 105 and the second face 106 of the insulating carrier 10.

And in the present embodiment, the first frequency segment at which the first primary antenna 11 and the first auxiliary antenna 12 operate includes 698-960 MHz, 1710-2690 MHz, 3300-4200 MHz and 4400-5000 MHz, in which, the first monopole antenna 111, the first coupling element 123 and the second coupling element 124 operate at a lower frequency segment (698-960 MHz, 1710-2690 MHz), the first parasitic element 112, the second monopole antenna 122 and the fourth monopole antenna 125 operate at a higher frequency segment (3300-4200 MHz, 4400-5000 MHz); the second frequency segment at which the second primary antenna 13 and the second auxiliary antenna 14 operate includes 2400-2485 MHz and 5150-5850 MHz, in which the third monopole antenna 131 and a radiating portion 1411 of the inversed-F antenna 141 operate at a lower frequency segment (2400-2485 MHz), the second parasitic element 132 and another radiating portion 1412 of the inversed-F antenna 141 operate at a higher frequency segment (5150-5850 MHz); the third frequency segment at which the global satellite navigation system antenna 2 operates is 1561-1602 MHz.

Figure 4:
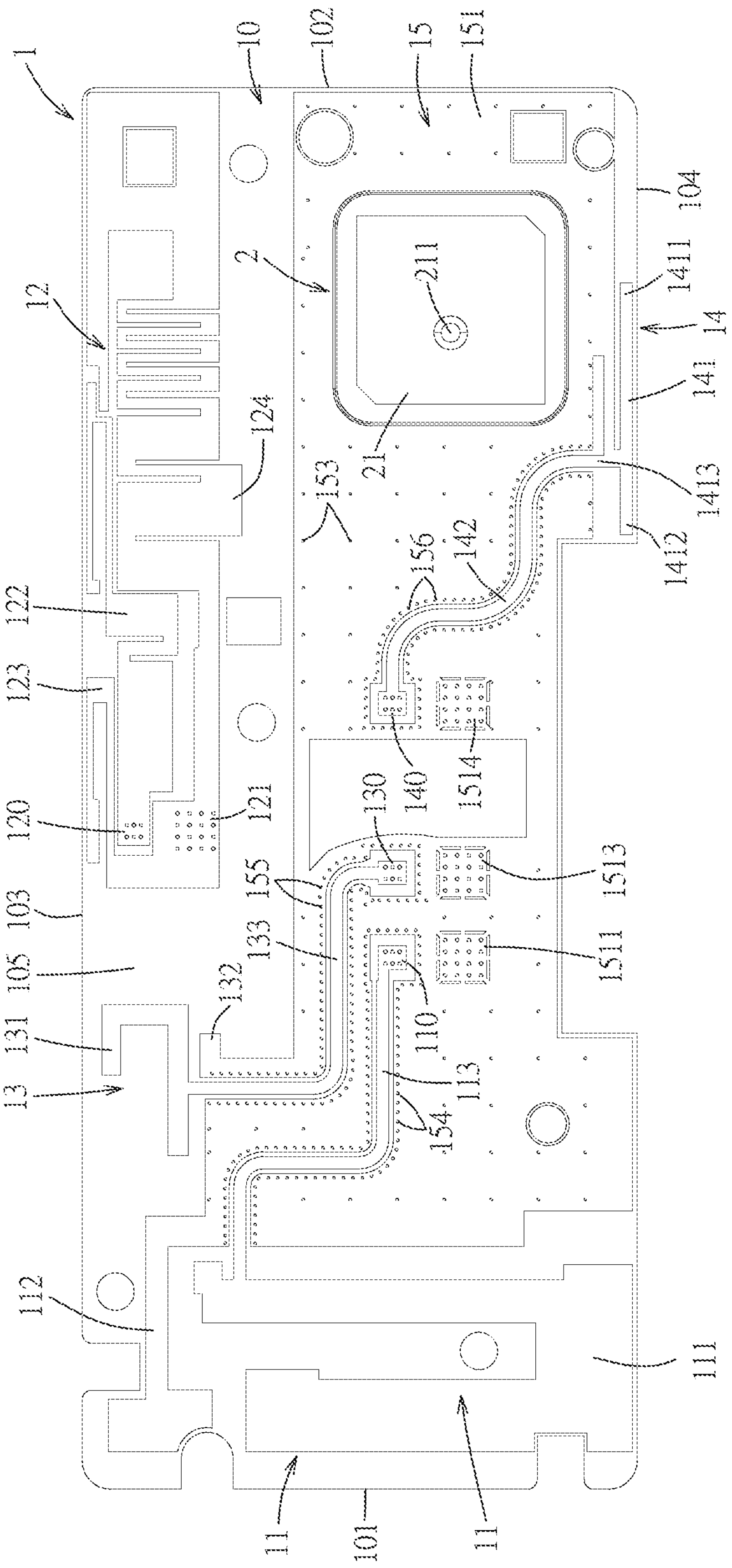
FIG. 4 is a construction schematic view of a first face of a circuit board of a second embodiment of the antenna device of the present disclosure.
Figure 5:
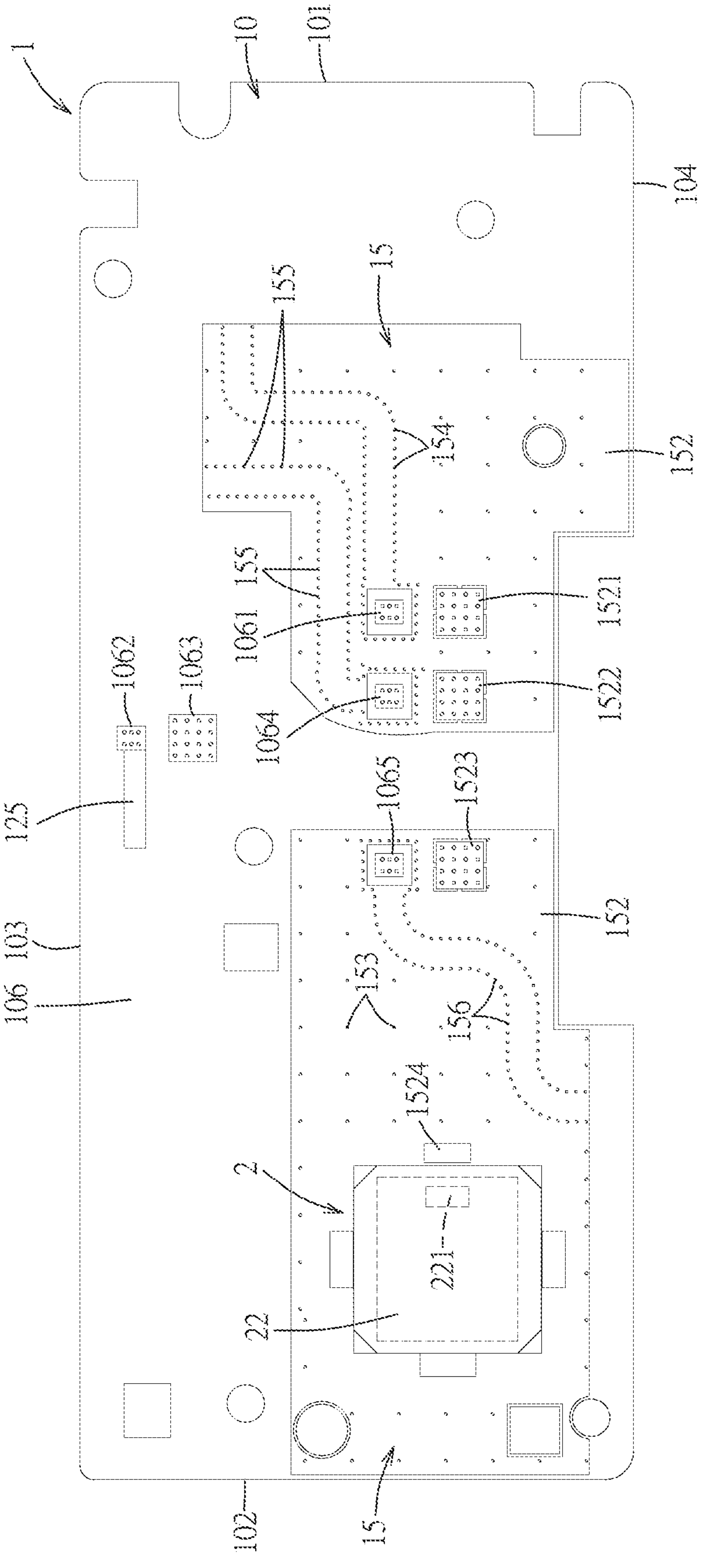
FIG. 5 is a construction schematic view of a second face of the circuit board of the second embodiment.

Further referring to FIG. 4 and FIG. 5, a second embodiment of the antenna device of the present disclosure is shown, a configuration of antennas in the second embodiment is substantially the same as the first embodiment, and the second embodiment is different from the first embodiment primarily in that, the first feeding-in section 110 is surrounded by the first grounding face 151 but is spaced apart from the first grounding face 151, and the first primary antenna 11 further includes a first microstrip line 113, the first microstrip line 113 extends outwardly from the first monopole antenna 111, enters into the first grounding face 151 in a manner that the first microstrip line 113 is spaced apart from the first grounding face 151, and connects the first feeding-in section 110; the third feeding-in section 130 is surrounded by the first grounding face 151 but is spaced apart from the first grounding face 151, and the second primary antenna 13 further includes a second microstrip line 133, the second microstrip line 133 extends outwardly from the third monopole antenna 131, enters into the first grounding face 151 in a manner that the second microstrip line 133 is spaced apart from the first grounding face 151, and connects the third feeding-in section 130; the fourth feeding-in section 140 is surrounded by the first grounding face 151 but is spaced apart from the first grounding face 151, and the second auxiliary antenna 14 further includes a third microstrip line 142, and the third microstrip line 142 extends outwardly from a feeding-in end 1413 of the inversed-F antenna 141, enters into the first grounding face 151 in a manner that the third microstrip line 142 is spaced apart from the first grounding face 151, and connects the fourth feeding-in section 140.

In another implementation, the third monopole antenna 131 and the inversed-F antenna 141 are interchanged, that is to say, when the inversed-F antenna 141 is connected with the third feeding-in section 130 but the third monopole antenna 131 is connected with the fourth feeding-in section 140, the second microstrip line 133 extends from the feeding-in end 1413 of the inversed-F antenna, enters into the first grounding face 151 in a manner that the second microstrip line 133 is spaced apart from the first grounding face 151, and connects the third feeding-in section 130; but the third microstrip line 142 extends from an end of the third monopole antenna 131, enters into the first grounding face 151 in a manner that the third microstrip line 142 is spaced apart from the first grounding face 151, and connects the fourth feeding-in section 140.

Figure 6:
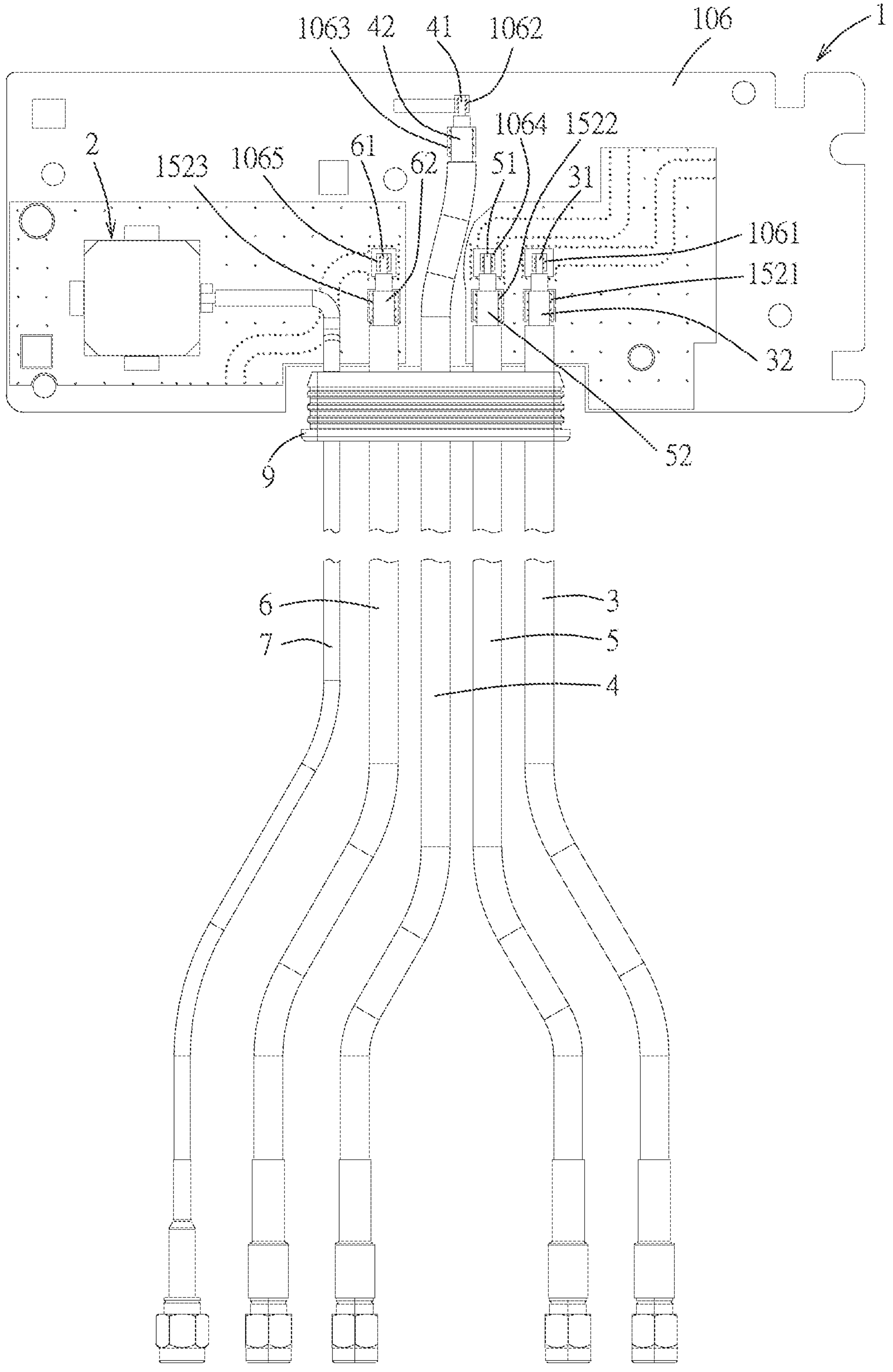
FIG. 6 is a schematic view of connections between the second face of the circuit board of the second embodiment and the multiple radio frequency transferring lines.

And in the present embodiment, the first feed-in soldering pad 1061 corresponds to the first feeding-in section 110 and is surrounded by the second grounding face 152 but is spaced apart from the second grounding face 152, the third feed-in soldering pad 1064 corresponds to the third feeding-in section 130 and is surrounded by the second grounding face 152 but is spaced apart from the second grounding face 152, the fourth feed-in soldering pad 1065 corresponds to the fourth feeding-in section 140 and is surrounded by the second grounding face 152 but is spaced apart from the second grounding face 152; and the first ground soldering pad 1521 formed on the second grounding face 152 is adjacent to the first feed-in soldering pad 1061, the third ground soldering pad 1522 formed on the second grounding face 152 is adjacent to the third feed-in soldering pad 1064, the fourth ground soldering pad 1523 formed on the second grounding face 152 is adjacent to the fourth feed-in soldering pad 1065, and the first ground soldering pad 1521 and the first ground soldering pad 1521, the third ground soldering pad 1522 and the third feed-in soldering pad 1064 and the fourth ground soldering pad 1523 and the fourth feed-in soldering pad 1065 are neatly arranged; therefore, as shown in FIG. 6, the first-fourth radio frequency transferring lines 3, 4, 5, 6 may be neatly arranged toward the same direction and may be respectively soldered with the corresponding feed-in soldering pads 1061, 1062, 1064, 1065 and the corresponding ground soldering pads 1521, 1063, 1522, 1523 provided on the second face 106 of the circuit board 1 to be electrically connected, that is to say, the inner conductors 31, 41, 51, 61 of the first-fourth radio frequency transferring lines 3, 4, 5, 6 are respectively soldered with the corresponding feed-in soldering pads 1061, 1062, 1064, 1065, and the outer conductors 32, 42, 52, 62 of the first-fourth radio frequency transferring lines 3, 4, 5, 6 are respectively soldered with the corresponding ground soldering pads 1521, 1063, 1522, 1523.

Moreover, in the present embodiment, electrical conduction through holes 154 which surround the first feeding-in section 110 and extend along two sides of the first microstrip line 113, electrical conduction through holes 155 which surround the third feeding-in section 130 and extend along two sides of the second microstrip line 133 and electrical conduction through holes 156 which surround the fourth feeding-in section 140 and extend along two sides of the third microstrip line 142 are formed between the first grounding face 151 and the second grounding face 152, and the electrical conduction through holes 154, 155, 156 electrically connect the first grounding face 151 and the second grounding face 152. And, the electrical conduction through holes 154, 155, 156 isolate the feeding-in sections 110, 130, 140 and the grounding section 1511, 1513, 1514 correspondingly and respectively extend along the respective two sides of the multiple microstrip lines 113, 133, 142, it may ensure an impedance of each of the multiple microstrip lines 113, 133, 142 maintains 50 ohm and prevent electromagnetic (EMC) interference.

Figure 7:
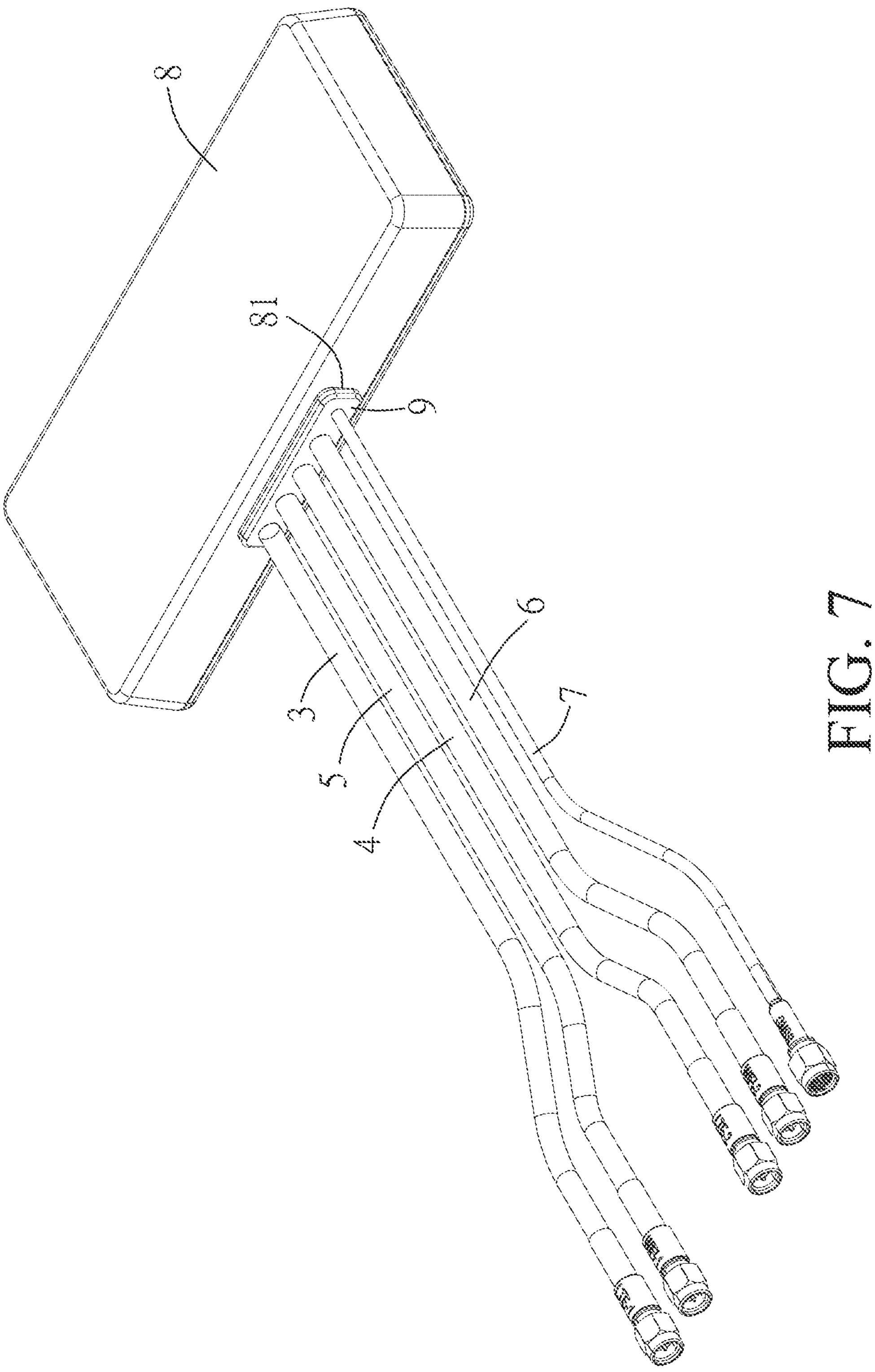
FIG. 7 is a schematic view that the circuit board of the second embodiment is accommodated in an outer casing.

Moreover, referring to FIG. 6 and FIG. 7, the present embodiment further includes an outer casing 8 accommodating the circuit board 1 and an elastic filler 9 filled into an opening 81 of the outer casing 8, the first-fifth radio frequency transferring lines 3, 4, 5, 6, 7 enter into the outer casing 8 via the opening 81, and the elastic filler 9 allows the first-fifth radio frequency transferring lines 3, 4, 5, 6, 7 to pass therethrough, so as to fix the first-fifth radio frequency transferring lines 3, 4, 5, 6, 7 onto the outer casing 8. And an external dimension of the outer casing 8 is 155 mm×65 mm×20 mm, therefore, it may be known that a dimension of the present embodiment antenna device is less than 155 mm×65 mm×20 mm.

Figure 8:
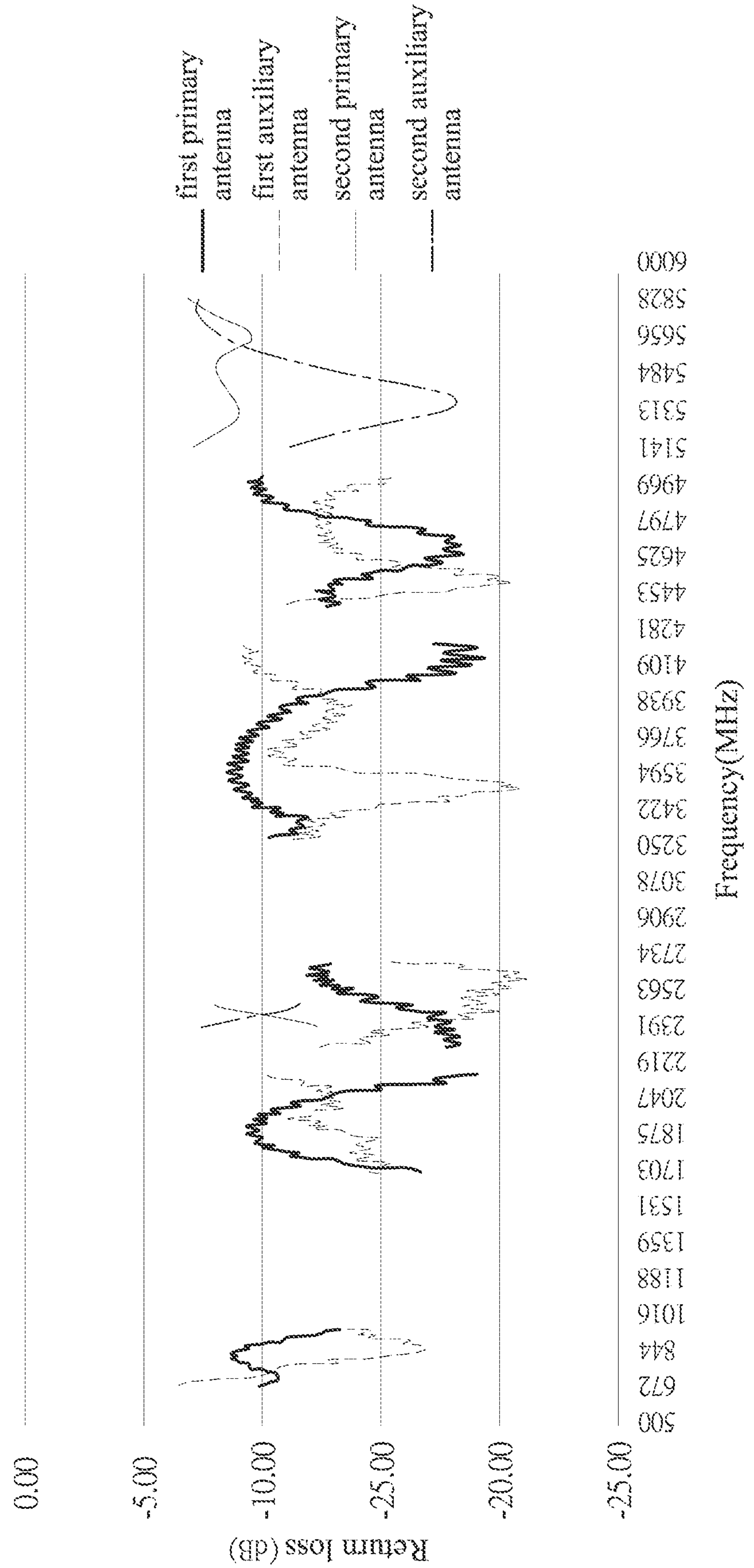
FIG. 8 illustrates return loss data of each antenna of the second embodiment at an operating frequency segment thereof.
Figure 9:
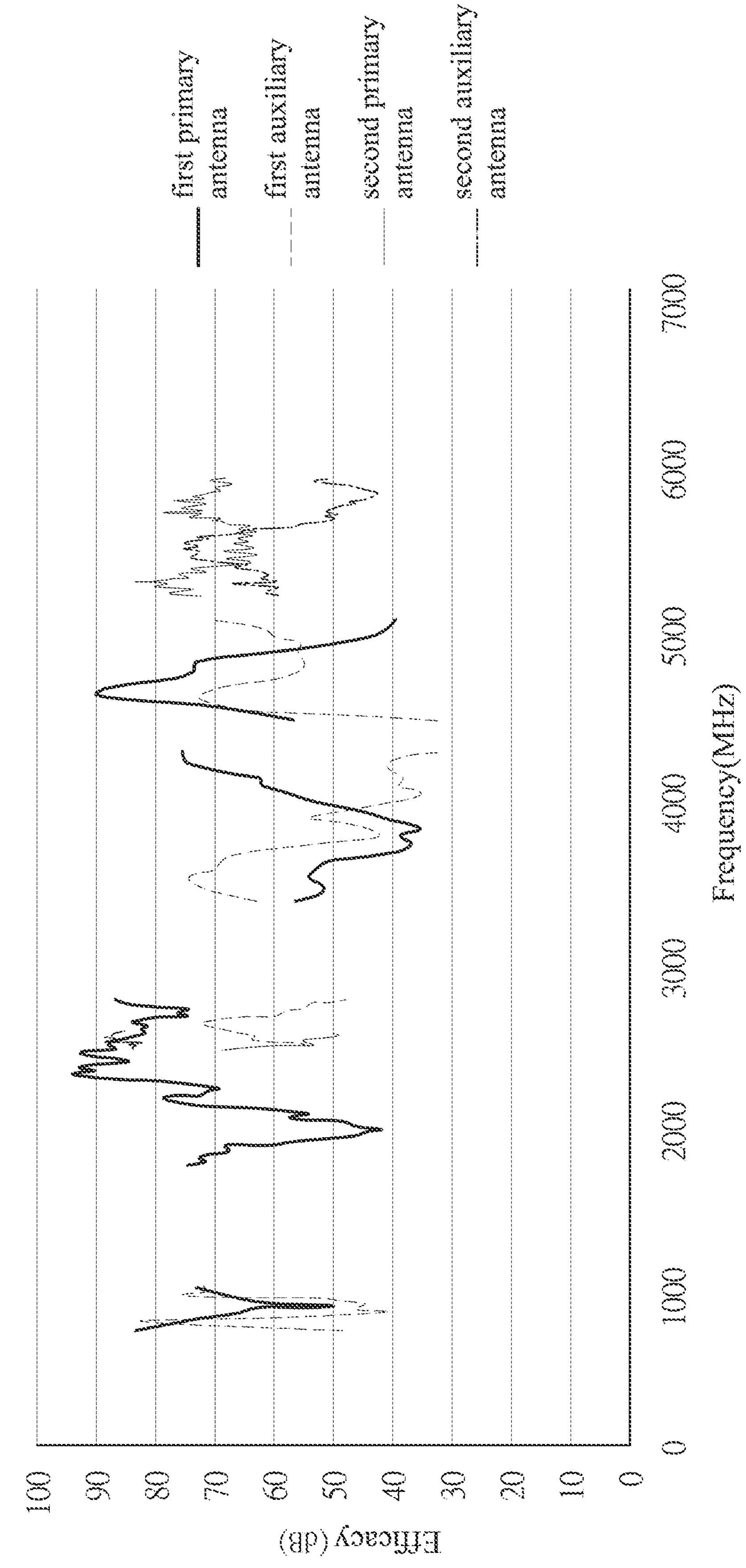
FIG. 9 illustrates radiation efficacy data of each antenna of the second embodiment at the operating frequency segment thereof.
Figure 10:
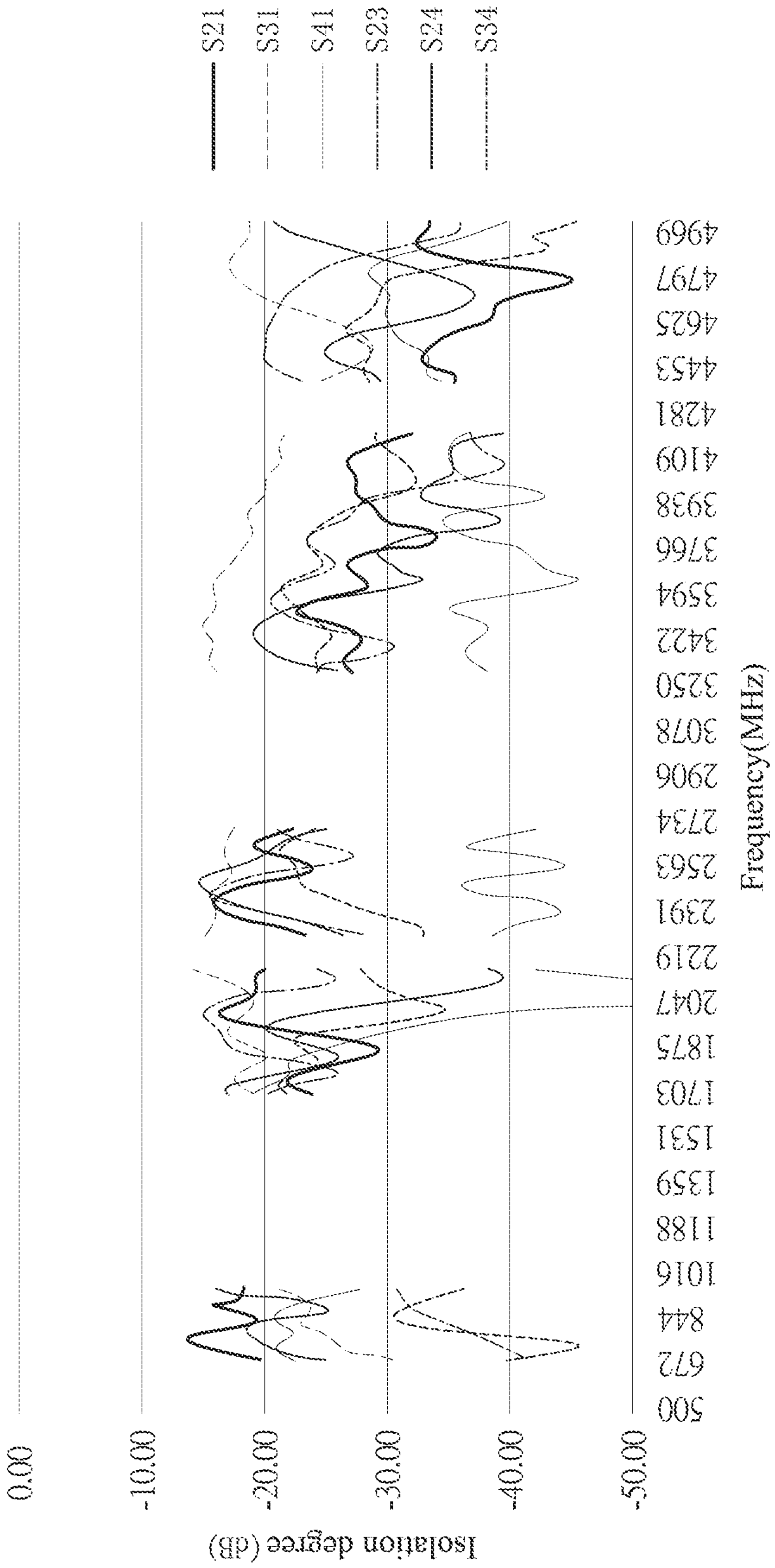
FIG. 10 illustrates isolation degree data between the antennas of the second embodiment.

Additionally referring to FIG. 8, it may be seen that, in the present embodiment, return losses of the first primary antenna 11, the first auxiliary antenna 12, the second primary antenna 13 and the second auxiliary antenna 14 at the operating frequency segments thereof all are less than −5 dB, and referring to FIG. 9, it may be seen that, radiation ratios of the first primary antenna 11, the first auxiliary antenna 12, the second primary antenna 13 and the second auxiliary antenna 14 at the operating frequency segments thereof all most exceed 50%, which indicates that the radiation efficacy is good; moreover, referring to FIG. 10, it may be seen that, an isolation degree S21 between the first primary antenna 11 and the first auxiliary antenna 12, an isolation degree S31 between the first primary antenna 11 and the second primary antenna 13, an isolation degree S41 between the first primary antenna 11 and the second auxiliary antenna 14, an isolation degree S23 between the first auxiliary antenna 12 and the second primary antenna 13, an isolation degree S24 between the first auxiliary antenna 12 and the second auxiliary antenna 14 and an isolation degree S34 between the second primary antenna 13 and the second auxiliary antenna 14 all are less than −10 dB, which indicates that the antennas has a good isolation degree therebetween.

In conclusion, the above embodiments makes the multiple types of the antennas integrated on the single small dimension circuit board and makes the antennas have good radiation performance and isolation degree, solves a problem that a traditional multiple-in-one antenna cannot meet small dimension, multiple frequency segment operation and high isolation degree (<−10 dB) at the same time, definitely attains the effect and the object of the present disclosure.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

The invention claimed is:

1. An antenna device, comprising:

a circuit board which comprises:

an insulating carrier having a first face and a second face which are opposite to each other;

a first primary antenna which operates at a first frequency segment and having a first feeding-in section, the first primary antenna being provided on the first face of the insulating carrier, the first primary antenna comprises a first monopole antenna connected with the first feeding-in section;

a first auxiliary antenna which operates at the first frequency segment and having a second feeding-in section and a second grounding section adjacent to the second feeding-in section, the first auxiliary antenna being provided on the first face of the insulating carrier, the first auxiliary antenna comprises a second monopole antenna which is connected with the second feeding-in section and at least one coupling element which extends outwardly from the second grounding section and is spaced apart from and adjacent to the second monopole antenna so as to be electrically coupled with the second monopole antenna;

a second primary antenna which operates at a second frequency segment and having a third feeding-in section, the second primary antenna being provided on the first face of the insulating carrier, the second primary antenna comprises a third monopole antenna connected with the third feeding-in section;

a second auxiliary antenna which operates at the second frequency segment and having a fourth feeding-in section, the second auxiliary antenna being provided on the first face of the insulating carrier, the second auxiliary antenna comprises an inversed-F antenna connected with the fourth feeding-in section; and a grounding unit comprising a first grounding face provided on the first face of the insulating carrier, the first grounding face is provided with a first grounding section adjacent to the first feeding-in section, a third grounding section adjacent to the third feeding-in section and a fourth grounding section adjacent to the fourth feeding-in section such that first grounding face is positioned between the first primary antenna and the first auxiliary antenna and is positioned between the second primary antenna and the second auxiliary antenna.

2. The antenna device of claim 1, wherein the first feeding-in section is surrounded by the first grounding face but is spaced apart from the first grounding face, and the first primary antenna further comprises a first microstrip line, the first microstrip line extends outwardly from the first monopole antenna, enters into the first grounding face in a manner that the first microstrip line is spaced apart from the first grounding face, and connects the first feeding-in section;

the third feeding-in section is surrounded by the first grounding face but is spaced apart from the first grounding face, and the second primary antenna further comprises a second microstrip line, the second microstrip line extends outwardly from the third monopole antenna, enters into the first grounding face in a manner that the second microstrip line is spaced apart from the first grounding face, and connects the third feeding-in section; and the fourth feeding-in section is surrounded by the first grounding face but is spaced apart from the first grounding face, and the second auxiliary antenna further comprises a third microstrip line, the third microstrip line extends from a feeding-in end of the inversed-F antenna, enters into the first grounding face in a manner that the third microstrip line is spaced apart from the first grounding face, and connects the fourth feeding-in section.

3. The antenna device of claim 2, wherein the grounding unit further comprises a second grounding face provided on the second face of the insulating carrier, electrical conduction through holes which surround the first feeding-in section and extend along two sides of the first microstrip line, electrical conduction through holes which surround the third feeding-in section and extend along two sides of the second microstrip line and electrical conduction through holes which surrounds the fourth feeding-in section and extend along two sides of the third microstrip line are formed between the first grounding face and the second grounding face, and the electrical conduction through holes electrically connects the second grounding face and the first grounding face.

4. The antenna device of claim 3, wherein the second face is formed with a first feed-in soldering pad which corresponds to the first feeding-in section and is surrounded by the second grounding face but is spaced apart from the second grounding face, a second feed-in soldering pad which corresponds to the second feeding-in section, a second ground soldering pad which corresponds to the second grounding section, a third feed-in soldering pad which corresponds to the third feeding-in section and is surrounded by the second grounding face but is spaced apart from the second grounding face, and a fourth feed-in soldering pad which corresponds to the fourth feeding-in section and is surrounded by the second grounding face but is spaced apart from the second grounding face;

the second grounding face is formed with a first ground soldering pad corresponding to the first grounding section, a third ground soldering pad corresponding to the third grounding section and a fourth ground soldering pad corresponding to the fourth grounding section; and wherein, electrical conduction through holes are formed between the first feeding-in section and the first feed-in soldering pad to electrically connect the first feeding-in section and the first feed-in soldering pad, electrical conduction through holes are formed between the second feeding-in section and the second feed-in soldering pad to electrically connect the second feeding-in section and the second feed-in soldering pad, electrical conduction through holes are formed between the third feeding-in section and the third feed-in soldering pad to electrically connect the third feeding-in section and the third feed-in soldering pad, electrical conduction through holes are formed between the fourth feeding-in section and the fourth feed-in soldering pad to electrically connect the fourth feeding-in section and the fourth feed-in soldering pad, electrical conduction through holes are formed between the first grounding section and the first ground soldering pad to electrically connect the first grounding section and the first ground soldering pad, electrical conduction through holes are formed between the second grounding section and the second ground soldering pad to electrically connect the second grounding section and the second ground soldering pad, electrical conduction through holes are formed between the third grounding section and the third ground soldering pad to electrically connect the third grounding section and the third ground soldering pad, and electrical conduction through holes are formed between the fourth grounding section and the fourth ground soldering pad to electrically connect the fourth grounding section and the fourth ground soldering pad.

5. The antenna device of claim 4, wherein the first feed-in soldering pad is used to be soldered with an inner conductor of a first radio frequency transferring line, the first ground soldering pad is used to be soldered with an outer conductor of the first radio frequency transferring line, the outer conductor and the inner conductor of the first radio frequency transferring line are insulated from each other;

the second feed-in soldering pad is used to be soldered with an inner conductor of a second radio frequency transferring line, the second ground soldering pad is used to be soldered with an outer conductor of the second radio frequency transferring line, the outer conductor and the inner conductor of the second radio frequency transferring line are insulated from each other;

the third feed-in soldering pad is used to be soldered with an inner conductor of a third radio frequency transferring line, the third ground soldering pad is used to be soldered with an outer conductor of the third radio frequency transferring line, the outer conductor and the inner conductor of the third radio frequency transferring line are insulated from each other; and the fourth feed-in soldering pad is used to be soldered with an inner conductor of a fourth radio frequency transferring line the fourth ground soldering pad is used to be soldered with an outer conductor of the fourth radio frequency transferring line the outer conductor and the inner conductor of the fourth radio frequency transferring line are insulated from each other.

6. The antenna device of claim 5, wherein the antenna device further comprises an outer casing accommodating the circuit board and an elastic filler filled into an opening of the outer casing, the first radio frequency transferring line, the second radio frequency transferring line, the third radio frequency transferring line and the fourth radio frequency transferring line enter into the outer casing via the opening, and the elastic filler allows the first radio frequency transferring line, the second radio frequency transferring line, the third radio frequency transferring line and the fourth radio frequency transferring line to pass therethrough, so as to fix the first radio frequency transferring line, the second radio frequency transferring line, the third radio frequency transferring line and the fourth radio frequency transferring line on the outer casing.

7. The antenna device of claim 1, wherein the grounding unit further comprises a second grounding face provided on the second face of the insulating carrier, and electrical conduction through holes are formed between the second grounding face and the first grounding face and electrically connect the second grounding face and the first grounding face.

8. The antenna device of claim 7, wherein the antenna device further comprises a global satellite navigation system antenna provided on the insulating carrier, and the global satellite navigation system antenna comprises a ceramic dielectric antenna operating at a third frequency segment, the ceramic dielectric antenna is provided on the first face of the insulating carrier.

9. The antenna device of claim 8, wherein the global satellite navigation system antenna further comprises a low noise amplifying circuit, the low noise amplifying circuit is provided on the second grounding face of the insulating carrier, the ceramic dielectric antenna is electrically connected with the low noise amplifying circuit via a feeding pin passing through the insulating carrier; and an outputting end of the low noise amplifying circuit is electrically connected with an inner conductor of a fifth radio frequency transferring line, and an outer conductor of the fifth radio frequency transferring line which is insulated from the inner conductor of the fifth radio frequency transferring line and a fifth grounding section which is formed on the second grounding face are electrically connected.

10. The antenna device of claim 8, wherein the first frequency segment comprises 698-960 MHz, 1710-2690 MHz, 3300-4200 MHz and 4400-5000 MHz;

the second frequency segment comprises 2400-2485 MHz and 5150-5850 MHz; and the third frequency segment comprises 1561-1602 MHz.

11. The antenna device of claim 1, wherein the first primary antenna further comprises a first parasitic element, the first parasitic element is spaced apart from and adjacent to the first monopole antenna so as to be electrically coupled with the first monopole antenna, and an end of the first parasitic element is connected with the first grounding face;

the first auxiliary antenna further comprises a fourth monopole antenna provided on the second face, and an end of the fourth monopole antenna is electrically connected with the second feeding-in section via electrical conduction through holes formed between the first face and the second face; and the second primary antenna further comprises a second parasitic element, the second parasitic element is spaced apart from and adjacent to the third monopole antenna so as to be electrically coupled with the third monopole antenna, and an end of the second parasitic element is connected with the first grounding face.

12. An antenna device, comprising:

a circuit board which comprises:

an insulating carrier having a first face and a second face which are opposite to each other;

a first primary antenna which operates at a first frequency segment and having a first feeding-in section, the first primary antenna being provided on the first face of the insulating carrier, the first primary antenna comprises a first monopole antenna connected with the first feeding-in section;

a first auxiliary antenna which operates at the first frequency segment and having a second feeding-in section and a second grounding section adjacent to the second feeding-in section, the first auxiliary antenna being provided on the first face of the insulating carrier, the first auxiliary antenna comprises a second monopole antenna which is connected with the second feeding-in section and at least one coupling element which extends outwardly from the second grounding section and is spaced apart from and adjacent to the second monopole antenna so as to be electrically coupled with the second monopole antenna;

a second primary antenna which operates at a second frequency segment and having a third feeding-in section, the second primary antenna being provided on the first face of the insulating carrier, the second primary antenna comprises an inversed-F antenna connected with the third feeding-in section;

a second auxiliary antenna which operates at the second frequency segment and having a fourth feeding-in section, the second auxiliary antenna being provided on the first face of the insulating carrier, the second auxiliary antenna comprises a third monopole antenna connected with the fourth feeding-in section; and a grounding unit comprising a first grounding face provided on the first face of the insulating carrier, the first grounding face is provided with a first grounding section adjacent to the first feeding-in section, a third grounding section adjacent to the third feeding-in section and a fourth grounding section adjacent to the fourth feeding-in section such that first grounding face is positioned between the first primary antenna and the first auxiliary antenna and is positioned between the second primary antenna and the second auxiliary antenna.

13. The antenna device of claim 12, wherein the first feeding-in section is surrounded by the first grounding face but is spaced apart from the first grounding face, and the first primary antenna further comprises a first microstrip line, the first microstrip line extends from an end of the first monopole antenna, enters into the first grounding face in a manner that the first microstrip line is spaced apart from the first grounding face, and connects the first feeding-in section;

the third feeding-in section is surrounded by the first grounding face but is spaced apart from the first grounding face, and the second primary antenna further comprises a second microstrip line, the second microstrip line extends from a feeding-in end of the inversed-F antenna, enters into the first grounding face in a manner that the second microstrip line is spaced apart from the first grounding face, and connects the third feeding-in section; and the fourth feeding-in section is surrounded by the first grounding face but is spaced apart from the first grounding face, and the second auxiliary antenna further comprises a third microstrip line, the third microstrip line extends from an end of the third monopole antenna, enters into the first grounding face in a manner that the third microstrip line is spaced apart from the first grounding face, and connects the fourth feeding-in section.

14. The antenna device of claim 13, wherein the grounding unit further comprises a second grounding face provided on the second face of the insulating carrier, electrical conduction through holes which surround the first feeding-in section and extend along two sides of the first microstrip line, electrical conduction through holes which surround the third feeding-in section and extend along two sides of the second microstrip line and electrical conduction through holes which surrounds the fourth feeding-in section and extend along two sides of the third microstrip line are formed between the first grounding face and the second grounding face, and the electrical conduction through holes electrically connects the second grounding face and the first grounding face.

15. The antenna device of claim 14, wherein the second face is formed with a first feed-in soldering pad which corresponds to the first feeding-in section and is surrounded by the second grounding face but is spaced apart from the second grounding face, a second feed-in soldering pad which corresponds to the second feeding-in section, a second ground soldering pad which corresponds to the second grounding section, a third feed-in soldering pad which corresponds to the third feeding-in section and is surrounded by the second grounding face but is spaced apart from the second grounding face, and a fourth feed-in soldering pad which corresponds to the fourth feeding-in section and is surrounded by the second grounding face but is spaced apart from the second grounding face;

the second grounding face is formed with a first ground soldering pad corresponding to the first grounding section, a third ground soldering pad corresponding to the third grounding section and a fourth ground soldering pad corresponding to the fourth grounding section; and wherein, electrical conduction through holes are formed between the first feeding-in section and the first feed-in soldering pad to electrically connect the first feeding-in section and the first feed-in soldering pad, electrical conduction through holes are formed between the second feeding-in section and the second feed-in soldering pad to electrically connect the second feeding-in section and the second feed-in soldering pad, electrical conduction through holes are formed between the third feeding-in section and the third feed-in soldering pad to electrically connect the third feeding-in section and the third feed-in soldering pad, electrical conduction through holes are formed between the fourth feeding-in section and the fourth feed-in soldering pad to electrically connect the fourth feeding-in section and the fourth feed-in soldering pad, electrical conduction through holes are formed between the first grounding section and the first ground soldering pad to electrically connect the first grounding section and the first ground soldering pad, electrical conduction through holes are formed between the second grounding section and the second ground soldering pad to electrically connect the second grounding section and the second ground soldering pad, electrical conduction through holes are formed between the third grounding section and the third ground soldering pad to electrically connect the third grounding section and the third ground soldering pad, and electrical conduction through holes are formed between the fourth grounding section and the fourth ground soldering pad to electrically connect the fourth grounding section and the fourth ground soldering pad.

16. The antenna device of claim 12, wherein the grounding unit further comprises a second grounding face provided on the second face of the insulating carrier, and electrical conduction through holes are formed between the second grounding face and the first grounding face and electrically connect the second grounding face and the first grounding face.

17. The antenna device of claim 16, wherein the antenna device further comprises a global satellite navigation system antenna provided on the insulating carrier, and the global satellite navigation system antenna comprises a ceramic dielectric antenna operating at a third frequency segment, the ceramic dielectric antenna is provided on the first face of the insulating carrier.

18. The antenna device of claim 17, wherein the global satellite navigation system antenna further comprises a low noise amplifying circuit, the low noise amplifying circuit is provided on the second grounding face of the insulating carrier, the ceramic dielectric antenna is electrically connected with the low noise amplifying circuit via a feeding pin passing through the insulating carrier; and an outputting end of the low noise amplifying circuit is electrically connected with an inner conductor of a fifth radio frequency transferring line, and an outer conductor of the fifth radio frequency transferring line which is insulated from the inner conductor of the fifth radio frequency transferring line and a fifth grounding section which is formed on the second grounding face are electrically connected.

19. The antenna device of claim 12, wherein the first primary antenna further comprises a first parasitic element, the first parasitic element is spaced apart from and adjacent to the first monopole antenna so as to be electrically coupled with the first monopole antenna, and an end of the first parasitic element is connected with the first grounding face;

the first auxiliary antenna further comprises a fourth monopole antenna provided on the second face, and an end of the fourth monopole antenna is electrically connected with the second feeding-in section via electrical conduction through holes formed between the first face and the second face; and the second primary antenna further comprises a second parasitic element, the second parasitic element is spaced apart from and adjacent to the third monopole antenna so as to be electrically coupled with the third monopole antenna, and an end of the second parasitic element is connected with the first grounding face.

20. The antenna device of claim 19, wherein the second face is formed with a first feed-in soldering pad which corresponds to the first feeding-in section and is surrounded by a second grounding face but is spaced apart from the second grounding face, a second feed-in soldering pad which corresponds to the second feeding-in section, a second ground soldering pad which corresponds to the second grounding section, a third feed-in soldering pad which corresponds to the third feeding-in section and is surrounded by the second grounding face but is spaced apart from the second grounding face, and a fourth feed-in soldering pad which corresponds to the fourth feeding-in section and is surrounded by the second grounding face but is spaced apart from the second grounding face;

the second grounding face is formed with a first ground soldering pad corresponding to the first grounding section, a third ground soldering pad corresponding to the third grounding section and a fourth ground soldering pad corresponding to the fourth grounding section; and wherein, electrical conduction through holes are formed between the first feeding-in section and the first feed-in soldering pad to electrically connect the first feeding-in section and the first feed-in soldering pad, electrical conduction through holes are formed between the second feeding-in section and the second feed-in soldering pad to electrically connect the second feeding-in section and the second feed-in soldering pad, electrical conduction through holes are formed between the third feeding-in section and the third feed-in soldering pad to electrically connect the third feeding-in section and the third feed-in soldering pad, electrical conduction through holes are formed between the fourth feeding-in section and the fourth feed-in soldering pad to electrically connect the fourth feeding-in section and the fourth feed-in soldering pad, electrical conduction through holes are formed between the first grounding section and the first ground soldering pad to electrically connect the first grounding section and the first ground soldering pad, electrical conduction through holes are formed between the second grounding section and the second ground soldering pad to electrically connect the second grounding section and the second ground soldering pad, electrical conduction through holes are formed between the third grounding section and the third ground soldering pad to electrically connect the third grounding section and the third ground soldering pad, and electrical conduction through holes are formed between the fourth grounding section and the fourth ground soldering pad to electrically connect the fourth grounding section and the fourth ground soldering pad.

21. The antenna device of claim 20, wherein the first feed-in soldering pad is used to be soldered with an inner conductor of a first radio frequency transferring line, the first ground soldering pad is used to be soldered with an outer conductor of the first radio frequency transferring line, the outer conductor and the inner conductor of the first radio frequency transferring line are insulated from each other;

the second feed-in soldering pad is used to be soldered with an inner conductor of a second radio frequency transferring line, the second ground soldering pad is used to be soldered with an outer conductor of the second radio frequency transferring line, the outer conductor and the inner conductor of the second radio frequency transferring line are insulated from each other;

the third feed-in soldering pad is used to be soldered with an inner conductor of a third radio frequency transferring line, the third ground soldering pad is used to be soldered with an outer conductor of the third radio frequency transferring line, the outer conductor and the inner conductor of the third radio frequency transferring line are insulated from each other; and the fourth feed-in soldering pad is used to be soldered with an inner conductor of a fourth radio frequency transferring line the fourth ground soldering pad is used to be soldered with an outer conductor of the fourth radio frequency transferring line the outer conductor and the inner conductor of the fourth radio frequency transferring line are insulated from each other.

22. The antenna device of claim 21, wherein the antenna device further comprises an outer casing accommodating the circuit board and an elastic filler filled into an opening of the outer casing, the first radio frequency transferring line, the second radio frequency transferring line, the third radio frequency transferring line and the fourth radio frequency transferring line enter into the outer casing via the opening, and the elastic filler allows the first radio frequency transferring line, the second radio frequency transferring line, the third radio frequency transferring line and the fourth radio frequency transferring line to pass therethrough, so as to fix the first radio frequency transferring line, the second radio frequency transferring line, the third radio frequency transferring line and the fourth radio frequency transferring line on the outer casing.

23. An antenna device, comprising:

a circuit board which comprises:

an insulating carrier having a first face and a second face which are opposite to each other;

a first primary antenna which operates at a first frequency segment and having a first feeding-in section, the first primary antenna being provided on the first face of the insulating carrier;

a first auxiliary antenna which operates at the first frequency segment and having a second feeding-in section and a second grounding section adjacent to the second feeding-in section, the first auxiliary antenna being provided on the first face of the insulating carrier;

a second primary antenna which operates at a second frequency segment and having a third feeding-in section, the second primary antenna being provided on the first face of the insulating carrier;

a second auxiliary antenna which operates at the second frequency segment and having a fourth feeding-in section, the second auxiliary antenna being provided on the first face of the insulating carrier; and a grounding unit comprising a first grounding face provided on the first face of the insulating carrier, the first grounding face is provided with a first grounding section adjacent to the first feeding-in section, a third grounding section adjacent to the third feeding-in section and a fourth grounding section adjacent to the fourth feeding-in section such that first grounding face is positioned between the first primary antenna and the first auxiliary antenna and is positioned between the second primary antenna and the second auxiliary antenna, a second grounding face provided on the second face of the insulating carrier, and electrical conduction through holes are formed between the second grounding face and the first grounding face to electrically connect the second grounding face and the first grounding face, the second face is formed with a first feed-in soldering pad corresponding to the first feeding-in section, a second feed-in soldering pad corresponding to the second feeding-in section, a second ground soldering pad corresponding to the second grounding section, a third feed-in soldering pad corresponding to the third feeding-in section and a fourth feed-in soldering pad corresponding to the fourth feeding-in section, and the second grounding face is formed with a first ground soldering pad corresponding to the first grounding section, a third ground soldering pad corresponding to the third grounding section and a fourth ground soldering pad corresponding to the fourth grounding section; and wherein electrical conduction through holes are formed between the first feeding-in section and the first feed-in soldering pad to electrically connect the first feeding-in section and the first feed-in soldering pad, electrical conduction through holes are formed between the second feeding-in section and the second feed-in soldering pad to electrically connect the second feeding-in section and the second feed-in soldering pad, electrical conduction through holes are formed between the third feeding-in section and the third feed-in soldering pad to electrically connect the third feeding-in section and the third feed-in soldering pad, electrical conduction through holes are formed between the fourth feeding-in section and the fourth feed-in soldering pad to electrically connect the fourth feeding-in section and the fourth feed-in soldering pad, electrical conduction through holes are formed between the first grounding section and the first ground soldering pad to electrically connect the first grounding section and the first ground soldering pad, electrical conduction through holes are formed between the second grounding section and the second ground soldering pad to electrically connect the second grounding section and the second ground soldering pad, electrical conduction through holes are formed between the third grounding section and the third ground soldering pad to electrically connect the third grounding section and the third ground soldering pad, and electrical conduction through holes are formed between the fourth grounding section and the fourth ground soldering pad to electrically connect the fourth grounding section and the fourth ground soldering pad.

24. The antenna device of claim 23, wherein the first feed-in soldering pad is used to be soldered with an inner conductor of a first radio frequency transferring line, the first ground soldering pad is used to be soldered with an outer conductor of the first radio frequency transferring line, the outer conductor and the inner conductor of the first radio frequency transferring line are insulated from each other;

the second feed-in soldering pad is used to be soldered with an inner conductor of a second radio frequency transferring line, the second ground soldering pad is used to be soldered with an outer conductor of the second radio frequency transferring line, the outer conductor and the inner conductor of the second radio frequency transferring line are insulated from each other;

the third feed-in soldering pad is used to be soldered with an inner conductor of a third radio frequency transferring line, the third ground soldering pad is used to be soldered with an outer conductor of the third radio frequency transferring line, the outer conductor and the inner conductor of the third radio frequency transferring line are insulated from each other; and the fourth feed-in soldering pad is used to be soldered with an inner conductor of a fourth radio frequency transferring line the fourth ground soldering pad is used to b soldered with an outer conductor of the fourth radio frequency transferring line the outer conductor and the inner conductor of the fourth radio frequency transferring line are insulated from each other.

25. The antenna device of claim 24, wherein the antenna device further comprises an outer casing accommodating the circuit board and an elastic filler filled into an opening of the outer casing, the first radio frequency transferring line, the second radio frequency transferring line, the third radio frequency transferring line and the fourth radio frequency transferring line enter into the outer casing via the opening, and the elastic filler allows the first radio frequency transferring line, the second radio frequency transferring line, the third radio frequency transferring line and the fourth radio frequency transferring line to pass therethrough, so as to fix the first radio frequency transferring line, the second radio frequency transferring line, the third radio frequency transferring line and the fourth radio frequency transferring line on the outer casing.

26. An antenna device, comprising:

a circuit board which comprises:

an insulating carrier having a first face and a second face which are opposite to each other;

a first grounding face provided on the first face of the insulating carrier and having a grounding section;

an antenna provided on the first face of the insulating carrier and having a radiating body being spaced apart from the first grounding face by the insulating carrier, a feeding-in section surrounded by the first grounding face and being spaced apart from the first grounding face by the insulating carrier, and a microstrip line extending from an end of the radiating body to the feeding-in section, the microstrip line entering into the first grounding face but being spaced apart from the first grounding face by the insulating carrier, wherein a first end of the microstrip line is at the end of the radiating body and a second end of the microstrip line is at the feeding-in section;

a second grounding face provided on the second face of the insulating carrier, the second face is formed with a feed-in soldering pad corresponding to the feeding-in section and a ground soldering pad corresponding to the grounding section, the feed-in soldering pad being spaced apart from the second grounding face by the insulating carrier;

spaced apart first electrical conduction through holes are provided between the second grounding face and the first grounding face to electrically connect the second grounding face and the first grounding face, the first electrical conduction through holes surrounding the feeding-in section and extending along two sides of the microstrip line from proximate to the first end of the microstrip line to proximate to the second end of the microstrip line;

second electrical conduction through holes are formed through the insulative carrier between the feeding-in section and the feed-in soldering pad to electrically connect the feeding-in section and the feed-in soldering pad; and third electrical conduction through holes are formed through the insulative carrier between the grounding section and the ground soldering pad to electrically connect the grounding section and the ground soldering pad, and wherein the feed-in soldering pad is used to be soldered with an inner conductor of a first radio frequency transferring line, the ground soldering pad is used to be soldered with an outer conductor of the first radio frequency transferring line, the outer conductor and the inner conductor of the first radio frequency transferring line are insulated from each other.

27. The antenna device of claim 26, wherein the antenna comprises a first antenna and further comprising a second antenna provided on the first face of the insulating carrier and having a radiating body, a feeding-in section surrounded by the first grounding face and being spaced apart from the first grounding face by the insulating carrier, and a microstrip line extending from an end of the radiating body to the feeding-in section, the microstrip line entering into the first grounding face but being spaced apart from the first grounding face by the insulating carrier.

* * * * *